(12) United States Patent
Carson et al.

(10) Patent No.: US 6,391,806 B1
(45) Date of Patent: *May 21, 2002

(54) FLEXIBLE, CUT RESISTANT, AND ABSORBENT FIBROUS SHEET MATERIALS

(75) Inventors: John Kit Carson, Fairfield; Richard Emil Hildebrand, IV, West Chester; James Cameron Horney, Cincinnati; John David Norcom, West Chester; Geneva Gail Otten, Cincinnati, all of OH (US)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,494

(22) Filed: Jun. 18, 1999

(51) Int. Cl.⁷ .............................. B32B 3/00; B32B 3/28; B32B 27/14; B32B 23/02
(52) U.S. Cl. ..................... 442/327; 428/156; 428/167; 428/172; 428/192; 428/195; 428/138; 4/581; 442/148
(58) Field of Search ................................. 428/138, 195, 428/156, 167, 172, 192; 4/581; 442/86, 148

(56) References Cited

U.S. PATENT DOCUMENTS 4,328,275 A * 5/1982 Vargo .......................... 428/156
5,270,089 A * 12/1993 Alston et al. ................ 428/138

* cited by examiner

Primary Examiner—Terrel Morris
Assistant Examiner—Alexis Wachtel
(74) Attorney, Agent, or Firm—Peter D. Meyer

(57) ABSTRACT

The present invention provides a liquid absorbent fibrous substrate having a plurality of discontinuous cells in which a second material is disposed. This second material is selected from a broad variety of organic or inorganic solids which may provide a reinforcing effect such that a sharp instrument is prevented from passing through the new composite structure. The reinforcing materials are disposed in a discontinuous array, in a cellular form in the fibrous substrate thus providing a path for liquids to be absorbed into said fibrous substrate, while said reinforcing materials provide resistance to penetration by sharp edged instruments. When disposed in this manner, flexibility is maintained since the reinforcing materials are not disposed in a continuous pattern. Preferably, the pattern disposed is free of linear regions that provide a continuous line of penetration for sharp edges. More preferably, the pattern is designed with a pattern of interlocking shapes which constrain said linear regions to essentially short lengths. The reinforcing cellular pattern may be embossed above said absorbent fibrous substrate or may be substantially co-planar with said fibrous substrate. The composite substrate may also be backed with a liquid impervious layer, either as a separate layer applied thereto the bottom surface, or as an applied coating. The liquid impervious surface may be usefully selected with a high co-efficient of friction to provide a non-skid surface.

10 Claims, 1 Drawing Sheet

FLEXIBLE, CUT RESISTANT, AND ABSORBENT FIBROUS SHEET MATERIALS

FIELD OF THE INVENTION

The present invention is directed to a liquid absorbent and knife resistant food preparation substrate designed to provide cut resistance, flexibility and liquid absorbency in a single product. The substrate of this invention will effectively integrate these features, resulting in a consumer impression of value and efficacy.

BACKGROUND OF THE INVENTION

Typically, liquid absorbent substrates require a construction using low density, absorbent structures such as cellulose pads, foams and the like. This type of construction provides good liquid acquisition/retention and generally acceptable flexibility but little or no resistance to penetration by a cutting instrument. Conversely, a knife resistant substrate will be typically manufactured from a high density material such as ceramic, wood or polymer sheets. These cut resistant surfaces have very limited flexibility and are typically not liquid absorbent.

Prior art designs have not been successful in integration of the above noted features due to limitations in choice of materials and/or design. For example, U.S. Pat. No. 5,520,945 (Coggins) uses a non-woven as a barrier between the absorbent layer and the food item. This limits the cut resistance to that inherent in the non-woven, typically very poor if the non-woven is to be expected to also provide liquid transport to the absorbent. Conversely, U.S. Pat. No. 5,472,790 (Thompson) discloses a polypropylene sheet designed as a food preparation surface which indicates a reasonable degree of cut resistance, but has no degree of absorbency.

Accordingly, it would be desirable to provide multiple diverse properties such as cut resistance, abrasion resistance, and flexibility in a unitary material structure.

It would further be desirable to provide such a material which may be readily and economically manufactured.

SUMMARY OF THE INVENTION

The objects and advantages of this invention will be set forth in part in the description which follows, and in part will be obvious from the description, or may be learned by practice of the invention. To achieve the foregoing objects and in according with the purpose of the invention, as embodied and broadly described herein, there is disclosed:

A liquid absorbent fibrous substrate having a plurality of discontinuous cells in which a second material is disposed. This second material is selected from a broad variety of organic or inorganic solids which may provide a reinforcing effect such that a sharp instrument is prevented from passing through the new composite structure.

Said fibrous mat may be, but not limited to, an alpha cellulose substrate of typical paper manufacturing origin, or it may be constructed of regenerated cellulose or it may be constructed of entangled synthetic fibers, commonly referred to as a non-woven substrate, or it may be a combination of above fibrous materials.

Reinforcing materials may be, but not limited to, thermoplastic or thermoset polymers as well as inorganic materials which may be used with or without organic materials, such as polymers. The reinforcing materials are disposed in a discontinuous array, in a cellular form in the fibrous substrate thus providing a path for liquids to be absorbed into said fibrous substrate, while said reinforcing materials provide resistance to penetration by sharp edged instruments. When disposed in this manner, flexibility is maintained since the reinforcing materials are not disposed in a continuous pattern. Preferably, the pattern disposed is free of linear regions that provide a continuous line of penetration for sharp edges. More preferably, the pattern is designed with a pattern of interlocking shapes which constrain said linear regions to essentially short lengths. Said reinforcing cellular pattern may be embossed above said absorbent fibrous substrate or may be substantially co-planar with said fibrous substrate.

Said composite substrate may also be backed with a liquid impervious layer, either as a separate layer applied thereto the bottom surface, or as an applied coating. Said liquid impervious surface may be usefully selected with a high co-efficient of friction to provide a non-skid surface.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

According to the present invention, a cut resistant yet liquid absorbent sheet is provided by use of discontinuous regions embedded in a fibrous matrix substrate. The discontinuous regions provide acceptable cut resistance while allowing liquids to pass therebetween and absorbed by the fibrous substrate. The discontinuous regions further provide a preferred level of flexibility, commensurate with ease of disposability and/or transport of prepared food items to containers.

Figure 1:
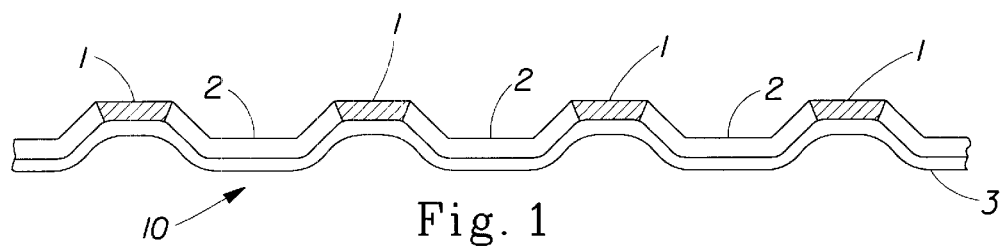
FIG. 1 is a cross-sectional view of one embodiment of an absorbent and cut-resistant sheet material according to the present invention.
Figure 2:
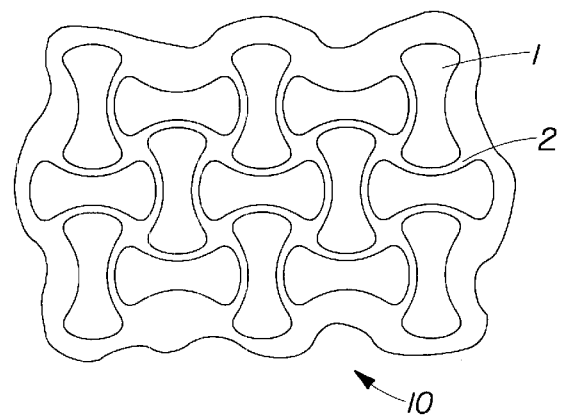
FIG. 2 is a plan view of the sheet material of FIG. 1.

In one preferred embodiment of a substrate 10, as shown in FIGS. 1 and 2, the fibrous matrix is comprised of a paper stock manufactured using a 50/50 blend of southern hardwood kraft and southern softwood kraft, with 0.5% Kymene 557H added by solids weight. The paper had a dry basis weight of 165 lb. / 3000 sq. ft. which is embossed to raise discontinuous regions 1 above the continuous network 2. These raised regions are then saturated with a liquid thermoset, the resin being Shell 862 with Shell 3234 hardener blended per the manufacturers specifications. This reinforcing polymer greatly improves the cut resistance of these regions. In one preferred embodiment, the shape of each of the raised regions 1 interlocks with each other to create an array of bow-tie-shaped reinforcing regions that has very short, and narrow, unreinforced, absorbent fibrous exposure 2, thereby improving the cut resistance, without substantially decreasing the liquid absorbency. Subsequently, this composite is backed with a 0.075 mm thick film 3 of linear low density polyethylene (LLDPE), optionally catalyzed with metallocene, to provide a liquid impermeable barrier and to provide a skid resistant back surface. Preferred back surface materials exhibit a coefficient of friction of at least about 0.4.

Figure 3:
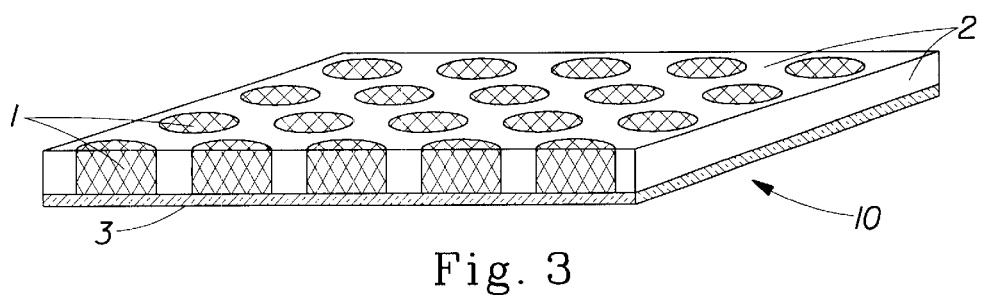
FIG. 3 is a partially-segmented perspective view of one embodiment of an absorbent and cut-resistant sheet material according to the present invention.

In another preferred embodiment of a substrate 10, as shown in FIG. 3, the fibrous matrix is comprised of a paper stock which was manufactured using a 50/50 blend of southern hardwood kraft and southern softwood kraft, with 0.5% Kymene 557H added by solids weight. The paper had a dry basis weight of 165 lb./3000 sq. ft. but in this case, the polymer reinforced regions 1 are not embossed above the continuous network 2, but are co-planar with the remainder of the substrate. These regions are then saturated with a liquid thermoset, the resin is Shell 862 with Shell 3234 hardener blended per the manufacturers specifications. This reinforcing polymer greatly improves the cut resistance of these regions. In one preferred embodiment, the shape of each of the reinforced regions 1 interlocks with each other to create an array that has very short, and narrow, unreinforced, absorbent fibrous exposure 2, thereby improving the cut resistance, without substantially decreasing the liquid absorbency. Subsequently, this composite is backed with a 0.075 mm thick film 3 of LLDPE, optionally catalyzed with metallocene, to provide a liquid impermeable barrier and to provide a skid resistant back surface.

Figure 4:
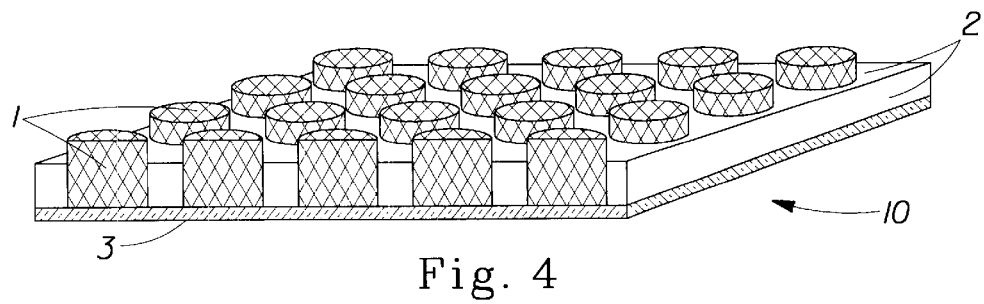
FIG. 4 is a partially-segmented perspective view of another embodiment of an absorbent and cut-resistant sheet material according to the present invention.

In another preferred embodiment of a fibrous substrate 10, as shown in FIG. 4, the fibrous matrix is formed into a three-dimensional, paper structure having a continuous paper network 2, that network defining voids 1 in which a thermoplastic reinforcing polymer is deposited. The reinforcing polymer is then melted in place by heat and/or pressure, thereby fused and amalgamated into and with the paper in discontinuous regions. The surface of the reinforced regions are preferably co-planar with the paper surface, but may be substantially above or below the paper surface. In one preferred embodiment, the shape of each of the reinforced regions 1 interlocks with each other to create an array that has very short, and narrow, unreinforced, absorbent fibrous exposure 2, thereby improving the cut resistance, without substantially decreasing the liquid absorbency. Subsequently, this composite is backed with a 0.075 mm thick film 3 of LLDPE, optionally catalyzed with metallocene, to provide a liquid impermeable barrier and to provide a skid resistant back surface.

Figure 5:
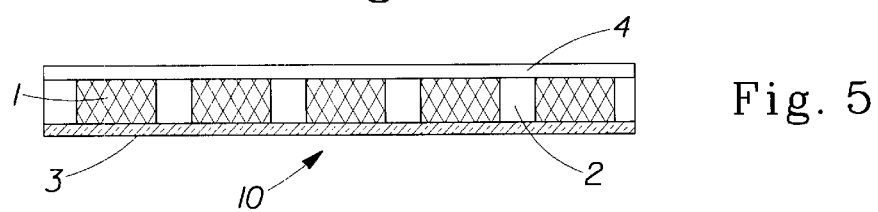
FIG. 5 is a cross-sectional view of yet another embodiment of an absorbent and cut-resistant sheet material according to the present invention.

FIG. 5 is a cross-sectional view of an embodiment of a sheet material 10 similar to FIG. 3, but having a thin fibrous layer 4 applied to the uppermost surface to mask the appearance of the regions 1.

Regions such as those depicted in FIGS. 1–5 may take any form, size, and arrangement desired, either regular or irregular. For example, the regions may share a common size and/or shape, or may differ from each other. They may also be arranged in a regular repeating array pattern, or may be irregularly arranged. The regions may form an amorphous pattern such as those defeloped for the prevention of nesting in wound rolls of three dimensional sheet products. Such patterns have been disclosed in U.S. Pat. No. 5,965,235, issued Oct. 12, 1999 in the names of McGuire, Tweddell, and Hamilton, entitled "Three-Dimensional, Nesting-Resistant Sheet Materials and Method and Apparatus for Making Same", the disclosure or which is hereby incorporated herein by reference.

In use, the sheet material is placed upon a supporting surface such as a countertop, tabletop, or floor surface and an object or substance is placed thereon. The object or substance may be a food item or any other item of interest which is to be manipulated or otherwise handled or treated during the course of any operation. The sheet material could also be utilized for storage of an object to collect residual fluids. After use or when the absorbent layer has become sufficiently contaminated or saturated with fluids, the sheet material may be disposed of in a responsible manner.

The sheet material is preferably sufficiently flexible and conformable such that it will conform to somewhat irregular or profiled supporting surfaces. For certain dispensing or packaging configurations, it may also be desirable for the sheet material to be sufficiently conformable in one or more directions such that it may be rolled upon itself to form a more compact configuration. Selection of materials for respective elements of the sheet material, as well as maintaining a comparatively low bending modulus via appropriate structural design (small cross-section, minimal thickness normal to the plane of the sheet material, discontinuous pattern, etc.), aids in obtaining the desired degree of flexibility. Weakened zones or lines, such as score lines, may be employed if desired to add additional flexibility and/or to promote folding or bending in certain directions or regions.

Additional absorbent capacity and protection of underlying and surrounding surfaces may also be provided in the form of a highly absorbent border at the periphery of the sheet material, a lip around the marginal edge, or other suitable techniques.

When subjected to impact from a sharp object or cutting implement such as a knife having an elongated, substantially linear edge, the sheet material is configured such that the impacting edge will contact at least one, and preferably more than one, element of the reinforcing system to distribute the impact force and ensure that the impacting edge will not contact the comparatively more vulnerable absorbent layer and barrier layer underneath and/or between the elements.

Sheet materials in accordance with the present invention may be deployed in a wide variety of scenarios and be utilized for a wide variety of functions. Representative products made from such sheet materials and corresponding uses include, but are not limited to, place mats, food preparation mats, mats for draining washed or cooked food, floor mats, drawer and shelf liners, etc. Objects of interest may include food items such as cuts of meat, produce, baked goods, produce such as fruits and vegetables, etc. Substances of interest would include substances having sufficient integrity to bridge the standoff system, such as cookie dough, etc.

A more detailed discussion of methods for evaluating the performance of such composite sheet materials may be found in commonly-assigned, concurrently-filed, co-pending U.S. patent application Ser. No. 09/336,496, entitled "Multi-Purpose Absorbent and Cut-Resistant Sheet Materials", the disclosure of which is hereby incorporated herein by reference.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. An absorbent substrate having opposed first and second surfaces, said substrate comprising:

(a) a continuous fibrous matrix;

(b) a plurality of discrete reinforcing regions in said first surface surrounded by and separated from one another by said continuous fibrous matrix; and, (c) a fluid impervious layer on said second surface.

2. The substrate of claim 1, wherein said reinforcing regions extend outwardly beyond said first surface.

3. The substrate of claim 1, wherein said reinforcing regions lie in a common plane with said fibrous matrix in said first surface.

4. The substrate of claim 1, wherein said reinforcing regions comprise a liquid thermoset.

5. The substrate of claim 1, wherein said continuous fibrous matrix comprises a paper stock.

6. The substrate of claim 1, wherein said fluid impervious layer comprises a polymeric material.

7. The substrate of claim 1, wherein said fluid impervious layer exhibits a coefficient of friction of at least about 0.4.

8. The substrate of claim 1, wherein said fibrous matrix comprises a substrate of synthetic fibers.

9. The substrate of claim 1, wherein said reinforcing regions comprise a thermoplastic.

10. The substrate of claim 1, wherein said reinforcing regions form a tessellating pattern.

* * * * *